(12) United States Patent
Zhang (10) Patent No.: US 11,415,555 B2
(45) Date of Patent: Aug. 16, 2022

(54) ULTRASONIC THROUGH-WALL SENSORS

(71) Applicant: UNIVERSITY OF NORTH TEXAS, Denton, TX (US)

(72) Inventor: Haifeng Zhang, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 117 days.

(21) Appl. No.: 16/914,914

(22) Filed: Jun. 29, 2020

(65) Prior Publication Data

US 2021/0003533 A1    Jan. 7, 2021

Related U.S. Application Data (60) Provisional application No. 62/869,092, filed on Jul. 1, 2019.

(51) Int. Cl.
*G01N 29/04* (2006.01)
*G01N 29/06* (2006.01)

(52) U.S. Cl.
CPC ....... *G01N 29/0654* (2013.01); *G01N 29/043* (2013.01); *G01N 2291/2636* (2013.01)

(58) Field of Classification Search
CPC ............. G01N 29/0654; G01N 29/043; G01N 2291/2636

USPC .......................................................... 73/606
See application file for complete search history.

(56) References Cited

U.S. PATENT DOCUMENTS

| | | | | |
|---|---|---|---|---|
| 6,037,704 A | * | 3/2000 | Welle | H04B 11/00 310/316.01 |
| 7,386,049 B2 | * | 6/2008 | Garrido | H04N 7/0125 375/240.15 |
| 7,505,782 B2 | * | 3/2009 | Chu | H04N 7/147 348/14.02 |
| 7,999,722 B2 | * | 8/2011 | Beeri | G01S 13/888 342/22 |
| 9,707,593 B2 | * | 7/2017 | Berte | B06B 1/0603 |
| 2010/0027379 A1 | * | 2/2010 | Saulnier | G08C 23/02 367/137 |

\* cited by examiner

*Primary Examiner* — Jacques M Saint Surin
(74) *Attorney, Agent, or Firm* — Thomas Horstemeyer, LLP (57) ABSTRACT

Aspects of ultrasonic through-wall data communication are described. In some aspects, a sensor device is located in an isolated environment behind a wall. A modulator generates a modulated sensor signal based on the binary sensor signal and a carrier signal. A coaxially aligned pair of electroacoustic transducers that transmits the modulated sensor signal through the wall of the isolated environment. A demodulator demodulates the modulated sensor signal to generate a demodulated binary sensor signal. A sensor data recovery component converts the demodulated binary sensor signal into an image or another sensor parameter.

20 Claims, 6 Drawing Sheets

ULTRASONIC THROUGH-WALL SENSORS

CROSS-REFERENCE TO RELATED APPLICATIONS

This application claims priority to and the benefit of U.S. Provisional Application No. 62/869,092, filed on Jul. 1 2019, entitled "ULTRASONIC THROUGH-WALL SENSORS," which is incorporated herein by reference in its entirety.

STATEMENT REGARDING FEDERALLY SPONSORED RESEARCH OR DEVELOPMENT

This invention was made with government support under DE-NE0008591 awarded by the Department of Energy. The government has certain rights in the invention.

BACKGROUND

High temperature environments, caustic environments, radioactive environments, and other harsh environments can be enclosed or otherwise walled off for protection of individuals, equipment, and other purposes. Such physical boundaries present huge challenges to sensing and instrumentation, because metal enclosures and thick concrete can shield electromagnetic waves, preventing the transmission of data. Wiring through holes in the vessel walls is undesirable and largely unfeasible in nuclear and other harsh environments. Harsh environments can require monitoring in order to ensure safe operation of equipment and industrial processes. However, nuclear reactor pressure vessels (RPVs), spent fuel storage canisters, the interior of carbon storage pipes, petroleum pipes, and other hazardous locations in the energy industry can also be impractical or impossible to monitor using traditional data transmission techniques.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

The present disclosure relates to ultrasonic through-wall data communication techniques. As noted above, traditional data transmission techniques can be impractical to utilize in this environment. For example, in nuclear industry many important components, such as nuclear reactor pressure vessels (RPVs) and spent fuel storage canisters, are completely enclosed by metal and surrounded by thick concrete walls. Spent fuel canisters can be lined with stainless steel cylinders. Monitoring overall status of spent fuel rods inside enclosed vessels is crucial to ensure the reactor's safe operation and fuel security. However, there is currently no internal sensing and instrumentation system which can provide direct measurements of these critical data because (1) there is no long-lasting electricity power supply for sensors inside the enclosed canisters, (2) data cannot be transferred out of the enclosed steel canister using wires or RF wireless, and (3) the harsh high temperatures of approximately 150-175° C. on the wall, and high radiation environment inside the enclosed vessel creates challenges for electronics and sensors. Similar sensing and communication needs and challenges exist for the nuclear reactor vessels of Boiling Water Reactors (BWR) and Pressurized Water Reactors (PWR). The interior of carbon storage pipes, petroleum pipes, and other hazardous locations in the energy industry can also be impractical or impossible to monitor using traditional data transmission techniques.

However, the present disclosure describes mechanisms that can enable through-wall data communication based on ultrasound propagation. The mechanisms described herein can achieve data signal delivery in harsh environments. The elimination of utilization of wires and cables can protect infrastructure integrity and avoid potential defects and fissures.

Figure 1:
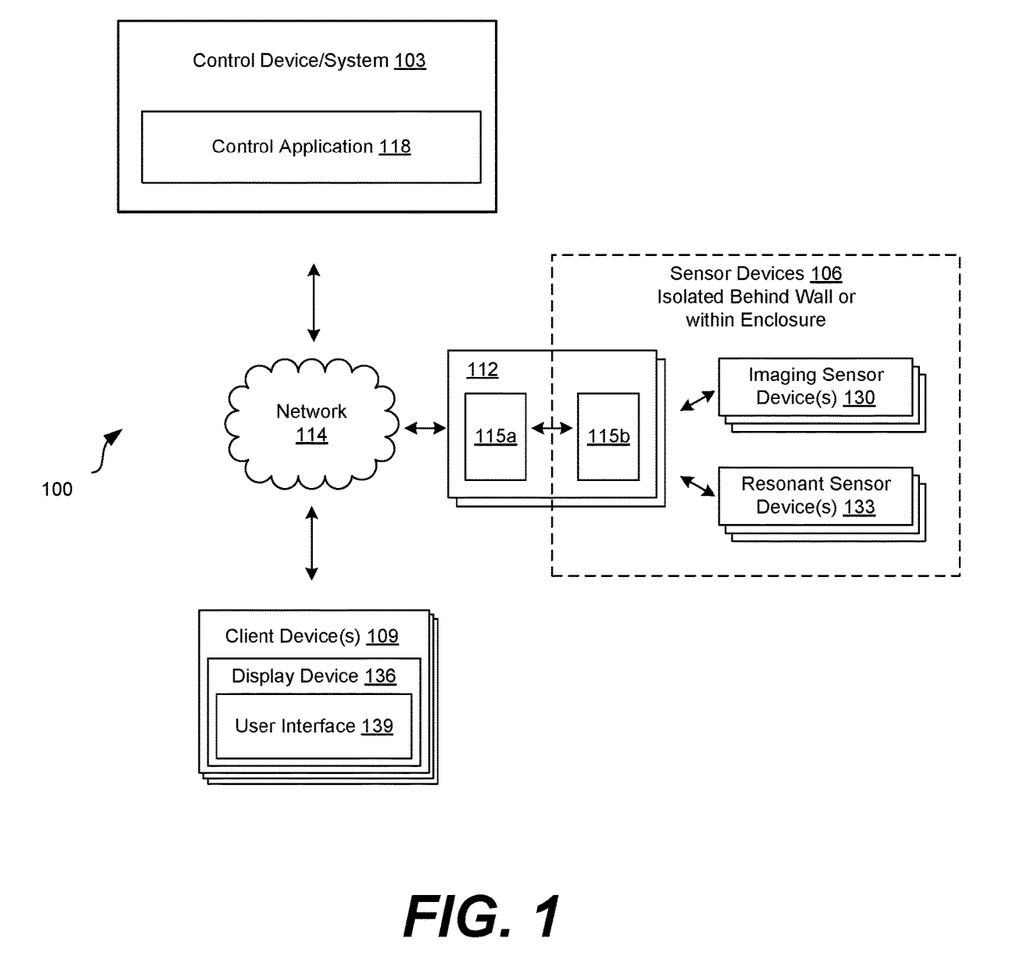
FIG. 1 illustrates an example ultrasonic through-wall sensor system according to various embodiments described herein.

FIG. 1 shows an example ultrasonic through-wall sensor system 100. The ultrasonic through-wall sensor system 100 can include a control device or system 103, one or more sensor devices 106, one or more client devices 109, and one or more electroacoustic pair 112 in communication through the wired or wireless network 114. The electroacoustic pair 112 can include an electroacoustic transducer 115a and an electroacoustic transducer 115b that are isolated from one another behind a wall and/or within an enclosure. The electroacoustic transducer 115a and the electroacoustic transducer 115b can be coaxially aligned, and the electroacoustic pair 112 can be a coaxially-aligned electroacoustic pair 112.

The control device 103 can be implemented using one or more computing device executing instructions such as a control application 118. The control device 103 can control and guide the operation of various types of ultrasonic through-wall sensor systems 100 as discussed with further detail with respect to FIGS. 2A-2C.

The sensor devices 106 can include imaging sensor device 130, resonant sensor devices 133, and other types of sensors. The sensor devices 106 can be isolated from the other components of the ultrasonic through-wall sensor system 100. For example, behind a wall and/or within an enclosure.

The client device 109 can include a computer system, mobile device, monitor, or other device that includes a screen or display device 136. The display device 136 can render a user interface 139. The user interface 139 can show images captured by the image sensor device 130 and reconstructed through the ultrasonic through-wall sensor system 100. The user interface 139 can also include measurements, notifications, and other elements that are generated and/or triggered based on the resonant frequency of the resonant sensor device 133. In some cases, the client device 109 can include control equipment that controls or adjusts environmental characteristics of an isolated environment such as a temperature, pressure, or other environmental characteristic. The control equipment can be adjusted in response to image data from the imaging sensor device 103 (e.g., infrared sensor indicating a particular temperature or a particular temperature in an image or within a particular region of the image). The control equipment can be adjusted in response to resonant sensor data indicative of a particular state or sensor measurement.

Figure 2A:
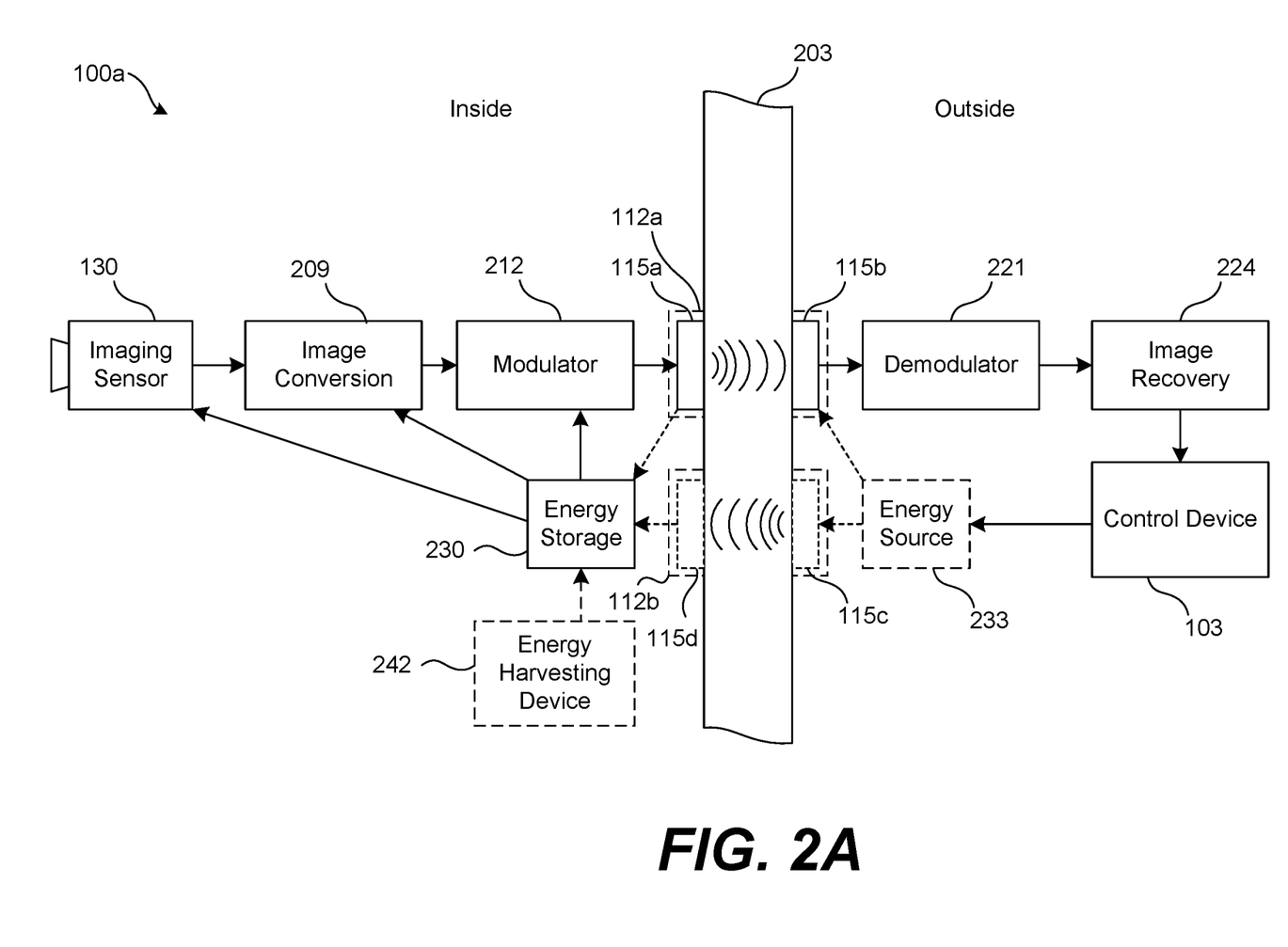
FIG. 2A illustrates an example ultrasonic through-wall sensor system for imaging devices, according to various embodiments described herein.

With reference to FIG. 2A, shown is an example of an ultrasonic through-wall imaging sensor system 100aa that enables image sensing through a wall of a contained environment. The contained environment can include a hazardous environment or any hard-to-access environment. The ultrasonic through-wall imaging sensor system 100aa can include an imaging sensor device 130, an image conversion component 209, a modulator component 212, an electroacoustic transducer 115a and an electroacoustic transducer 115b (i.e., an electroacoustic transducer pair 112a), a demodulator component 221, an image reconstruction or recovery component 224, and a control device 103. In some examples, the ultrasonic through-wall imaging sensor system 100a can also include one or more energy storage 230. In some cases, the energy storage 230 can obtain energy from an outside energy source 233 providing energy through the electroacoustic transducer pair 112a, or an electroacoustic transducer 115c and an electroacoustic transducer 115d (i.e., an electroacoustic transducer pair 112b). Additionally or alternatively, the energy storage 230 can obtain energy from and an inside energy harvesting device 242 within the controlled or isolated environment behind the wall 203.

Generally, the operation of the ultrasonic through-wall imaging sensor system 100a can include capturing an image using the imaging sensor device 130, converting the image to a data file by the image conversion component 209, converting the data file to binary bits by the image conversion component 209, generating a modulated signal by mixing a carrier signal with a binary signal or bitstream comprising the binary bits using the modulator 212, communicating the modulated signal through the wall 203 using the electroacoustic transducer pair 112a, demodulating the modulated signal using the demodulator 221, and recovering or reconstructing the image using the image recovery component 224. The control device 103 can control the operation of the components of the ultrasonic through-wall imaging sensor system 100a for communication of the image data.

The wall 203 can include a metal wall that helps to isolate or enclose an area. While the area can be a hazardous environment, the area can also be a cleanroom, or any contained environment (hazardous or non-hazardous) that is isolated using the wall 203. The wall 203 can include a flat metal wall, a cylindrical metal wall of a pipe, silo, or storage tank, or any other metal wall. The material of the wall 203 can include a metal such as stainless steel, carbon steel, or another steel wall. The wall 203 can also include high temperature and corrosion-resistant metals and alloys that include carbon steel, stainless steel, titanium, tungsten, nickel, molybdenum, and tantalum. The wall 203 can include a wall of any thickness. For example, spent fuel canisters can be lined with leak-tight 1 inch thick stainless steel cylinders The imaging sensor device 130 can include an imaging sensor device of a camera such as a hazardous environment camera. For example, the imaging sensor device 130 can include a water-tight, air-tight, and corrosion-resistant camera. In nuclear applications and other radioactive applications, the imaging sensor device 130 can include a high-temperature, radiation-hardened camera, such as thermal scientific CID8712D1M radiation hardened solid-state camera. The imaging sensor device 130 can capture or obtain images or image data that includes still images and video. In some examples, the imaging sensor device 130 can also capture or obtain audio or audio data. The imaging sensor device 130 can provide this data to the image conversion component 209. The images, video, and audio can be of an object, item, substance, entity, or condition within the contained environment.

The image conversion component 209 can include a dedicated hardware component, or can include a software component comprising instructions executed by a computing device. The image conversion component 209 can convert an image into a data file. The image conversion component 209 can convert an image file with an image file extension (e.g., *.png, *.bmp, *.jpg, *.gif, *.tif) into a data file with a data file extension (e.g., *.dat). For example, this can include conversion of a raster format image into a data file. Some images or images files can include moving or animated images.

The image conversion component 209 can also convert a video file with a video file extension (e.g., *.mkv, *.avi, *.gif, *.gifv, *.mov, *.wmv, *.mpg) into a data file with a data or text file extension (e.g., *.dat, *.txt). The image conversion component 209 can identify a file extension of the image file or video file, and can input the file into a particular image-to-data transformation function, for example, according to its file extension, in order to output or generate the data file. This image-to-data transformation function can convert the file from its initial format to a data format, and change the file extension to a data file extension.

The image conversion component 209 can convert the data file to binary bits. For example, the image conversion component 209 can identify a file extension of the data file, and can input the data file into a particular binary transformation function, for example, according to its file extension, in order to output or generate a binary or logic signal. The binary signal can be considered a binary image signal or image bitstream because it includes a sequence of binary bits converted from or describing the image or video. The binary image signal can be an analog signal. The binary image signal can include a baud rate determined based on the thickness and material of the wall 203. In various embodiments, any baud rate can be used. For example, a baud rate in the range of 1000 bits per second to 9600 bits per second, or greater baud rates can be used.

In some examples, the image conversion component 209 can convert the image or video file to binary bits directly. For example, the image conversion component 209 can identify a file extension of the image file or video file, and can input the file into a particular image-to-binary transformation function, for example, according to its file extension, in order to output or generate an analog binary signal that includes a sequence of the binary bits converted from the image or video.

The modulator component 212 can perform a modulation of the binary signal. The modulator component 212 can include a dedicated hardware component, or can include a software component comprising instructions executed by a computing device. In some cases, the modulator component 212 can be part of the same computing device as the image conversion component 209. In other examples, the can include a dedicated hardware component that is separate from the image conversion component 209. The modulator component 212 can perform amplitude modulation such as double sideband modulation, single sideband modulation, quadrature amplitude modulation, or another amplitude modulation. Alternatively, modulator component 212 can perform angle modulation such as frequency modulation or phase modulation. The modulator component 212 can mix the binary signal with a carrier signal to generate an amplitude modulated (or other modulated) signal. The carrier signal can be chosen based on an acoustic resonant frequency of the material of the wall 203. In the various embodiments cases, the carrier frequency can be in any frequency. The carrier frequency can be an ultrasonic frequency. For example, a carrier frequency can be a frequency that is equal to or greater than 20 kHz. The amplitude modulated signal can be considered an amplitude modulated image signal because it describes or is converted from the image or video. The amplitude modulated image signal can be an analog signal.

The electroacoustic transducer pair 112a (and the electroacoustic transducer pair 112b) can include transducers bonded or attached coaxially aligned on opposite sides of the wall 203. The amplitude modulated image signal can be provided to the electroacoustic transducer 115a. The electroacoustic transducer 115a can transmit the amplitude modulated image signal through the wall 203 to the electroacoustic transducer 115b. In this case, the electroacoustic transducer 115a can be considered a transmitter electroacoustic transducer 115a and the electroacoustic transducer 115b can be a receiver electroacoustic transducer 115b. However, in other situations, the electroacoustic transducer 115b can transmit power and/or data signals to the electroacoustic transducer 115a. An electroacoustic transducer can include a piezoelectric material or ceramic. For example, lead zirconate titanate (PZT), barium titanate, and other materials.

The demodulator component 221 can demodulate the amplitude modulated (or other modulated) image signal that is received by the electroacoustic transducer 115b. The demodulator component 221 can include a dedicated hardware component, or can include a software component comprising instructions executed by a computing device. In some cases, the electroacoustic transducer 115b provides the received amplitude modulated image signal to an amplifier (not shown), which provides the signal to the demodulator component 221. The amplitude modulated image signal can be input into the demodulator component 221, which can then output a demodulated binary image signal or image bitstream, which can be an analog signal. For amplitude modulated signals, the demodulator component 221 can demodulate the modulated image signal using envelope detection, product detection. A product detection demodulator component 221 can multiply the received amplitude modulated image signal by a local oscillator signal that matches the frequency and phase of the carrier wave of the amplitude modulated image signal.

The image recovery component 224 can process the demodulated binary image signal to recover the image or video. The image recovery component 224 can include a dedicated hardware component, or can include a software component comprising instructions executed by a computing device. For example, image recovery component 224 or another sensor data recovery component can convert a demodulated binary image signal into an image file formatted file with an image file extension or a video file formatted file with a video file extension. This can include conversion of the demodulated binary image into a binary file comprising the binary bits of the demodulated binary image signal. The binary file can be converted into an image file format or a video file format. Some images or images files can include moving or animated images.

The control device 103 can control the operation of the various components of the ultrasonic through-wall imaging sensor system 100a, for example, by transmitting commands or control signals to the various components. The control device 103 can include a computing device executing instructions that control the operation of the imaging sensor device 130, the image conversion component 209, the modulator 212, as well as the electroacoustic transducers 115a and 115b to guide the image communication process as described. For example, the control device 103 can transmit control signals to the imaging sensor device 130, the image conversion component 209, and the modulator 212 through the electroacoustic transducer pair 112a. In some examples the control device 103 can include the image recovery component 224 and/or the demodulator component 221.

In addition, the control device 103 can a power regulation process of the ultrasonic through-wall imaging sensor system 100a. For example, the control device 103 can provide power signals from the energy source 233 to charge the energy storage 230.

The power signals can be transmitted through the electroacoustic transducer pair 112a, or the electroacoustic transducer pair 112b. In some cases, this power can be sufficient to continuously power the inside components such as the imaging sensor device 130, the image conversion component 209, and the modulator 212. In other situations, the power regulation process can charge the energy storage device 130 to a predetermined threshold for a threshold duration, for example for a threshold duration, or until the energy storage device 130 is charged to a threshold charge. In some examples, the threshold duration is a duration associated with a threshold charge or amount of energy that would be stored by charging the energy storage device 130 using the power signal transmitted through one of the electroacoustic transduces pairs 112a or 112b (and/or using the energy harvesting device 242). In other examples, the energy storage device 130 can transmit a ready signal to the control system 120 through one of the electroacoustic transducer pairs 112a or 112b, once it stores a threshold charge or amount of energy.

In some examples, the imaging sensor device 130 can be configured to transmit an image or video in response to a threshold charge or amount of energy, and without receiving a signal from the outside control device 103. In other examples, the imaging sensor device 130 can be configured to transmit an image or video on a schedule that is reasonably designed based on the expected energy supplied and stored in the energy storage 230. These examples can be achieved using an inside control system that is separate from the outside control device 103. Such an inside control system can include a computing device comprising the image conversion component 209 and/or the modulator 212.

The energy storage 230 can include a battery, a capacitor, a supercapacitor, and other energy storage devices. The energy harvesting device 242 can capture ambient energy such as one or more of thermal energy, light energy, vibration energy, ambient electromagnetic radiation (EMR) and other ambient energies.

The electroacoustic transducer pair 112b can be utilized to provide energy from the energy source 233 to the energy storage 230. The electroacoustic transducer pair 136 can or transmit a power signal from the energy source 233 to the energy storage 230. The power signal can be a signal with a particular frequency that can maximize energy transmission, rather than data communication. In some examples, the power signal frequency can be a lower frequency than the carrier frequency described above. The power signal can also be an unmodulated signal.

Figure 2B:
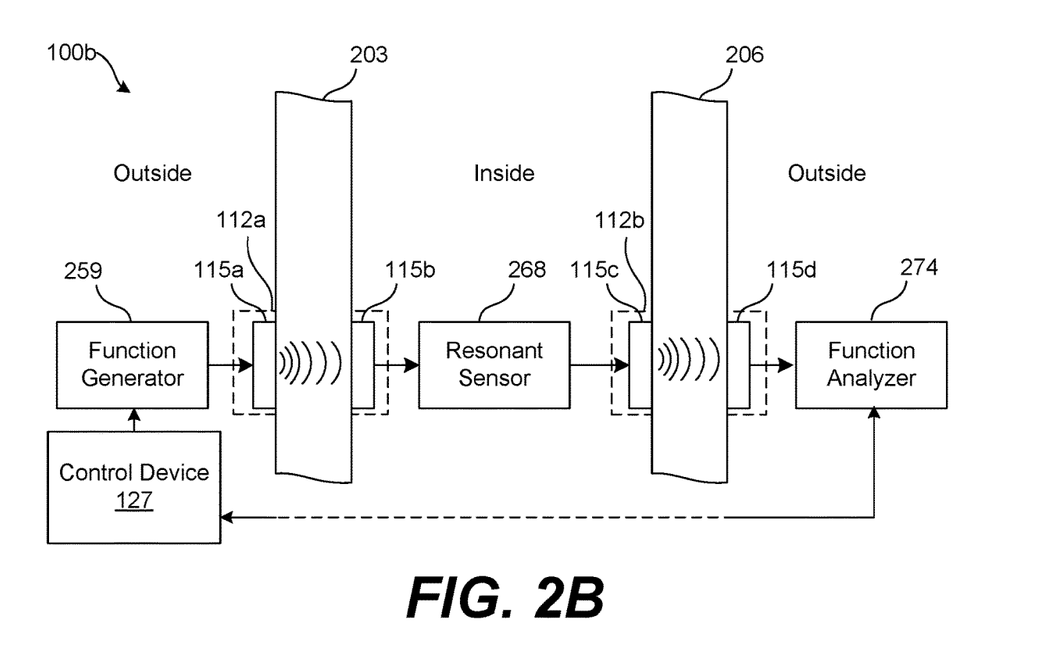
FIG. 2B illustrates an example ultrasonic through-wall sensor system for resonant devices, according to various embodiments described herein.

With reference to FIG. 2B, shown is an example of an ultrasonic through-wall resonant sensor system 100b for communication of resonant sensor data from the inside of a contained or isolated environment to the outside of the contained environment. In various embodiments, the contained environment can be a hazardous environment or any contained environment. The inside of the contained environment can be enclosed or otherwise walled off using a wall 203 and a wall 206. In some aspects, the wall 203 and wall 206 can be portions of a single wall, such as a tube or circular wall or a wall of any shape. The ultrasonic through-wall resonant sensor system 100b can include a function generator 259, an electroacoustic transducer 115a and an electroacoustic transducer 115b (i.e., the electroacoustic transducer pair 112a), a resonant sensor 268, an electroacoustic transducer 115c and an electroacoustic transducer 115d (i.e., the electroacoustic transducer pair 112b), a function analyzer or another sensor data recovery component 274, and a control device 127.

Generally, the operation of the ultrasonic through-wall resonant sensor system 100b can include generating a frequency sweep signal using the function generator 259, communicating the frequency sweep through the electroacoustic pair 112a to the resonant sensor 268 inside the contained environment, generating a sensor output signal, communicating the sensor output signal through the electroacoustic pair 218 to the function analyzer 274 outside of the contained environment, determining a resonant frequency of the sensor output signal, and identifying a sensor parameter based on the resonant frequency of the sensor output signal. As a result, the through-wall data communication system 100b can be a system that uses two pairs of electroacoustic transducers to obtain sensor data from a resonant sensor 268 within a contained environment.

The walls 203 and 206 can include metal walls that help to isolate or enclose an area. While the area can be a hazardous environment, the area can also be a cleanroom, or any contained environment (hazardous or non-hazardous) that is isolated using the walls 203 and 206. The walls 203 and 206 can include flat metal walls, or two locations on or sides of a cylindrical metal wall of a pipe, silo, or storage tank. The material of each of the walls 203 and 206 can include a metal such as stainless steel, carbon steel, or another steel wall. The walls 203 and 206 can also include high temperature and corrosion-resistant metals and alloys that include carbon steel, stainless steel, titanium, tungsten, nickel, molybdenum, and tantalum. The walls 203 and 206 can include a wall of any thickness.

The control device 127 can control the operation of the components of the ultrasonic through-wall resonant sensor system 100b, for example, by transmitting commands or control signals to the various components. The control device 127 can include a computing device executing a control application 118 or other instructions that control the operation of the function generator 259, the electroacoustic transducer pair 112a, the resonant sensor 268, as well as electroacoustic transducer pair 112b, and the function analyzer 274 to guide the sensor data communication process.

The function generator 259 can generate a frequency sweep signal. The frequency sweep signal can sweep through frequencies from a first frequency to a second frequency. The first and second frequencies can be selected based on operational parameters of the resonant sensor 268. The resonant sensor 268 can operate based on the frequency sweep signal, without any additional power supply or power signal. In some cases, the function generator 259 or a modulator component can modulate the frequency sweep signal using an ultrasonic carrier or other high frequency carrier signal. In other words, this can produce a modulated frequency sweep signal.

The electroacoustic transducer pair 112a (and the electroacoustic transducer pair 112b) can include transducers bonded coaxially aligned on opposite sides of the wall 203. The frequency sweep signal can be provided to the electroacoustic transducer 115a. The electroacoustic transducer 115a can transmit the amplitude modulated image signal through the wall 203 to the coaxially aligned electroacoustic transducer 115b. In this case, the electroacoustic transducer 115a can be considered a transmitter electroacoustic transducer 115a and the electroacoustic transducer 115b can be a receiver electroacoustic transducer 115b. An electroacoustic transducer can include a piezoelectric material or ceramic. For example, lead zirconate titanate (PZT), barium titanate, and other materials. In some cases, a demodulator component can demodulate the modulated frequency sweep signal to reproduce a demodulated frequency sweep signal, which can also be referred to as the frequency sweep signal.

The resonant sensor 268 can receive the frequency sweep signal as an input and output or generate a sensor output signal. The frequency sweep signal can excite the resonant sensor 268 to generate the sensor output signal. The sensor output signal can be provided to the electroacoustic transducer 115c by the resonant sensor 268. The resonant sensor 268 can include a surface acoustic wave (SAW) sensor, a bulk acoustic wave (BAW) sensor and other resonant sensors. The resonant sensor 268 can measure parameters including presence of humidity, viscosity, radiation, electromagnetic fields, chemical vapors, biological matter, and other items. In addition, the resonant sensor 268 can quantify the humidity, viscosity, radiation, electromagnetic fields, chemical vapors, biological matter, and other items.

For example, humidity sensing can include a thermoelectric cooler placed below or near the resonant sensor 268. Water vapor can condense on the resonant sensor 268, affecting the resonant frequency of the sensor output signal. For viscosity sensing, as a liquid becomes more viscous, the resonant frequency of the sensor output signal can be affected. A resonant sensor 268 can be made sensitive to optical wavelengths using a thin film layer of zinc oxide or other material that can generates charge carriers when exposed to ultraviolet or other radiation, and can affect the resonant frequency of the sensor output signal. Electromagnetic fields can be sensed using a resonant sensor 268 that includes a ferromagnetic material. Presence of electromagnetic fields can affect the ferromagnetic material and result in the resonant frequency of the sensor output signal. Resonant sensors 218 can include a thin film polymer that can selectively absorb the vapors or gases of interest to affect and result in a particular resonant frequency of the sensor output signal. Resonant sensors 218 can include a biologically-active layer. Biological matter resonant sensors 218 can detect presence or quantity of bacteria, viruses, mRNA, and proteins, and can result in a particular resonant frequency of the sensor output signal.

In some cases, the sensor output signal can be modulated using an ultrasonic carrier signal or another high frequency carrier signal. This can produce a modulated sensor output signal. Generally, modulated signals can be referred to as ultrasonic modulated signals when modulated using an ultrasonic carrier signal.

The electroacoustic transducer 115c can transmit the sensor output signal (e.g., the modulated sensor output signal) through the wall 206 to the coaxially aligned electroacoustic transducer 115d. In this case, the electroacoustic transducer 115c can be considered a transmitter electroacoustic transducer 115c and the electroacoustic transducer 115d can be a receiver electroacoustic transducer 115d. A demodulator can demodulate the modulated sensor output signal to generate a demodulated sensor output signal, which can also be referred to as the sensor output signal.

The function analyzer 274 or other sensor recovery component can include an oscilloscope, a spectrum analyzer and other function analyzers. The sensor recovery component or function analyzer 274 can include the demodulator. In some cases, the function analyzer 274 can be part of the control device 127, and in other cases, the function analyzer 274 can communicate with a separate control device 127. The function analyzer 274 can plot the sensor output signal in the frequency domain. The plot can be displayed on a display device of the function analyzer 274, control device 127, or another display device. The function analyzer 274 or control device 127 can analyze the frequency domain plot of the sensor output signal, to identify a resonant frequency of the sensor output signal. The function analyzer 274 or control device 127 can also determine a sensor parameter based on the resonant frequency of the sensor output signal. In some cases, the presence of a particular parameter, or a sensor parameter exceeding a threshold value, can result in an alert that is displayed on a display device of the control device 127 or another computing device. The ultrasonic through-wall data communication system 100b can also include energy storage device 230, energy harvesting devices, energy sources 233 and other components discussed with respect to FIG. 2A.

Figure 2C:
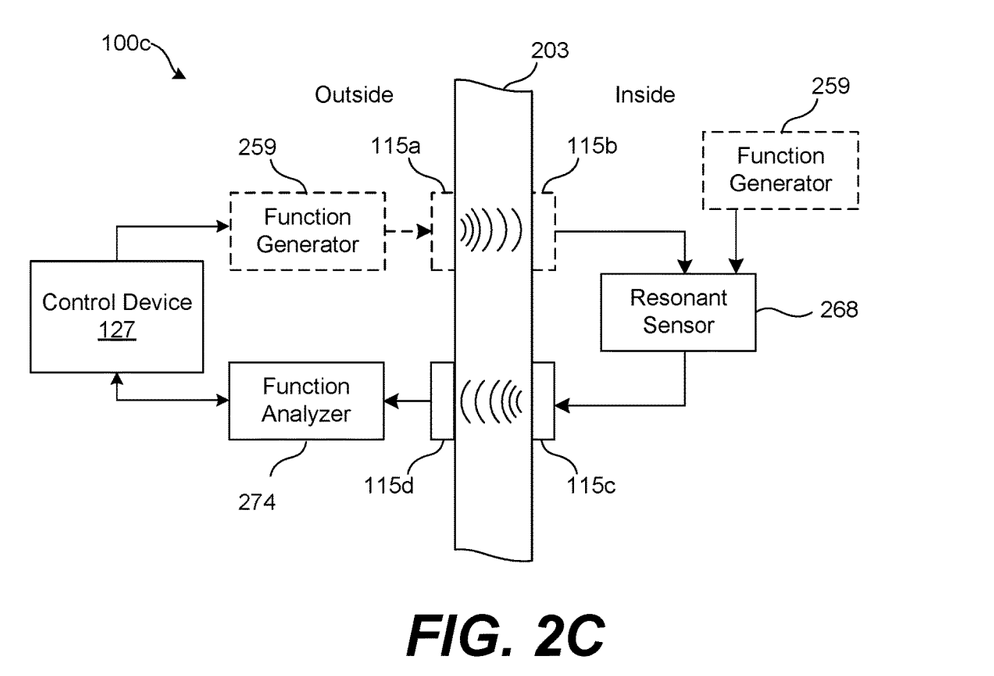
FIG. 2C illustrates another example ultrasonic through-wall sensor system for resonant devices, according to various embodiments described herein.

With reference to FIG. 2C, shown is an example of an ultrasonic through-wall data communication system 100c for communication of resonant sensor data from the inside of a contained environment to the outside of the contained environment. In various embodiments, the contained environment can be a hazardous environment or any contained environment. The components of the ultrasonic through-wall data communication system 100c can be similar to those of the ultrasonic through-wall resonant sensor system 100b. However, FIG. 2B illustrates that each of the transducer pairs 115a and 115b can be located on a single wall 203 between an inside of the hazardous environment to the outside of the hazardous environment. In this situation, the electroacoustic transducer 115c can transmit the sensor output signal through the wall 203 (rather than the wall 206) to the coaxially aligned electroacoustic transducer 115d. The ultrasonic through-wall data communication system 100c can also include energy storage device 230, energy harvesting devices, energy sources 233 and other components discussed with respect to FIG. 2A. In addition, FIG. 2C shows that the function generator 259 can be preprogrammed and located inside the isolated environment, and can be powered by the energy storage device 230, energy harvesting devices, energy sources 233 and other components.

Figure 3:
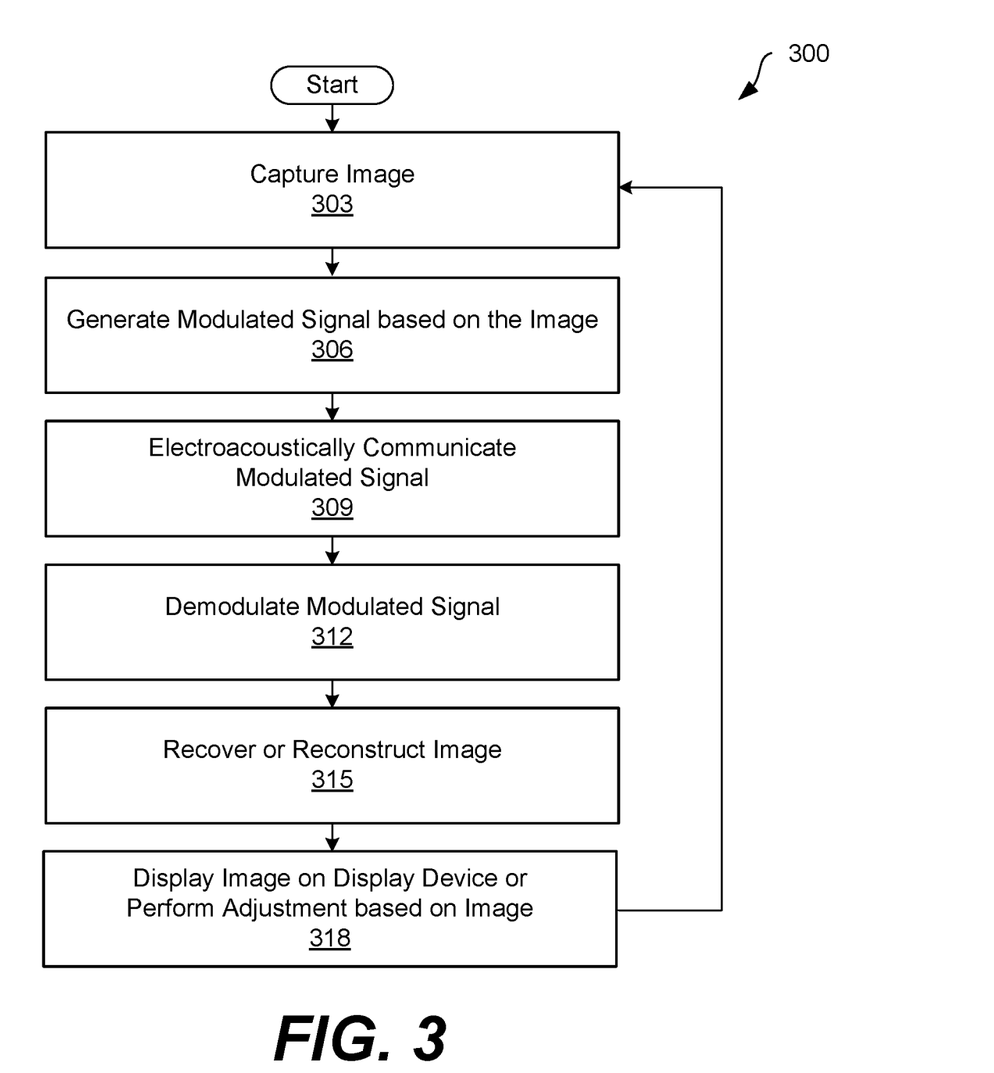
FIG. 3 illustrates a flowchart that describes aspects of the operation of an ultrasonic through-wall sensor system, according to various embodiments described herein.

FIG. 3 shows a flowchart 300 that describes aspects of the operation of an ultrasonic through-wall sensor system 100. Generally, the flowchart 300 describes how the ultrasonic through-wall sensor system 100 can obtain and display image data detected within an isolated environment by an isolated imaging sensor device 130.

In step 303, the ultrasonic through-wall sensor system 100 can capture an image within an isolated environment. The image can be captured using the imaging sensor device 130. The imaging sensor device 130 can capture or obtain images or image data that includes still images and video. In some examples, the imaging sensor device 130 can also capture or obtain audio or audio data. The imaging sensor device 130 can provide this data to the image conversion component 209. The images, video, and audio can be of an object, item, substance, entity, or condition within the contained environment.

In step 306, the ultrasonic through-wall sensor system 100 can generate a modulated image signal based on the image captured within the isolated environment. An image conversion component 209 of the ultrasonic through-wall sensor system 100 can converting the image to binary bits or a bitstream. In some examples, the image conversion component 209 can convert the image to a data file, and in other cases the camera or image sensing device 130 can provide the image as a data file. The image data can include one or more still images, or a video. A modulator component 212 of the ultrasonic through-wall sensor system 100 can ultimately generate the modulated signal by mixing a carrier signal with a binary signal or bitstream comprising the binary bits. The modulated signal can be considered a modulated image signal of the isolated environment.

In step 309, the ultrasonic through-wall sensor system 100 can electroacoustically communicate the modulated image signal through a wall. The modulated image signal can be communicated through the wall 203 using an electroacoustic transducer pair 112.

In step 312, the ultrasonic through-wall sensor system 100 can demodulate the modulated signal. A demodulator 221 of the ultrasonic through-wall sensor system 100 can demodulated the modulated image signal and output a demodulated image signal. The demodulator component 221 can include a dedicated hardware component, or can include a software component comprising instructions executed by a computing device. In some cases, the electroacoustic transducer 115b provides the received amplitude modulated image signal to an amplifier, which provides the signal to the demodulator component 221.

In step 315, the ultrasonic through-wall sensor system 100 can recover or reconstruct the image. An image recovery component 224 of the ultrasonic through-wall sensor system 100 can recover or reconstruct the image based on the demodulated image signal. In some cases the image recovery component 224 can include a demodulation process, and can recover or reconstruct the image based on the modulated image signal. The image recovery component 224 can convert a demodulated image signal into an image file formatted file with an image file extension or a video file formatted file with a video file extension. This can include conversion of the demodulated image into a binary file comprising the binary bits of the demodulated image signal. The binary file can be converted into an image file format or a video file format.

In step 318, the ultrasonic through-wall sensor system 100 can display the image on a display device or perform a control adjustment based on the reconstructed image. For example, the client device 109 can include a computer device, a monitor device, or a mobile device. The control system 103 can provide the reconstructed image to the client device 109 for display on a display device 106.

In other examples, the client device 109 can include control equipment that controls or adjusts environmental characteristics of an isolated environment such as a temperature, pressure, or other environmental characteristic. The control system 103 can be adjust the control equipment in response to image data from the imaging sensor device 103 such as an image or an infrared image indicating a particular temperature or a particular temperature or a particular temperature within a particular region of the image.

Figure 4:
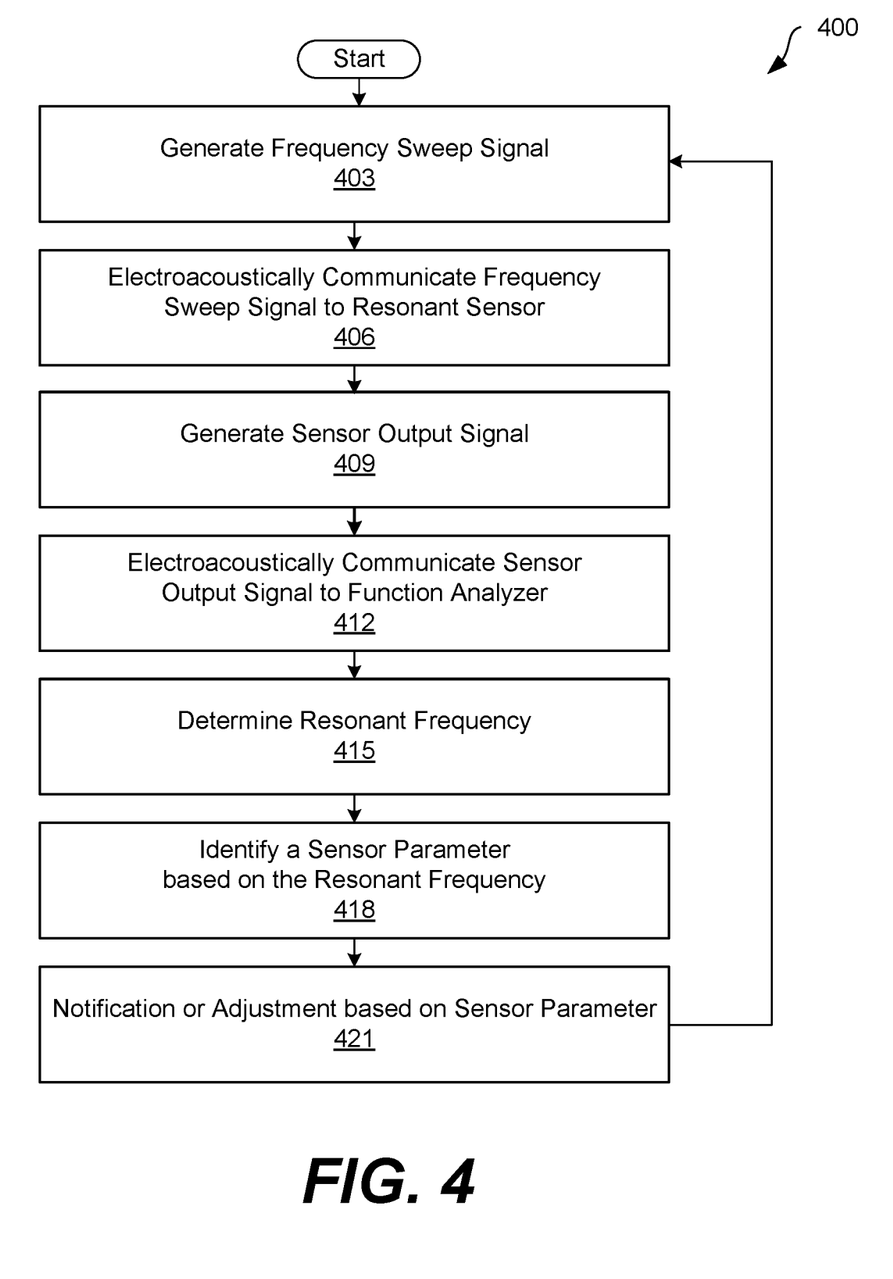
FIG. 4 illustrates a flowchart that describes aspects of the operation of an ultrasonic through-wall sensor system, according to various embodiments described herein.

FIG. 4 shows a flowchart 400 that describes aspects of the operation of an ultrasonic through-wall sensor system 100. Generally, the flowchart 400 describes how the ultrasonic through-wall sensor system 100 can obtain resonant sensor data detected within an isolated environment by an isolated resonant sensor device 133.

In step 403, the ultrasonic through-wall sensor system 100 can generate a frequency sweep signal. A function generator 259 of the ultrasonic through-wall sensor system 100 can generate the frequency sweep signal. The frequency sweep signal can sweep through frequencies from a first frequency to a second frequency. The first and second frequencies can be selected based on operational parameters of the resonant sensor 268. The resonant sensor 268 can operate based on the frequency sweep signal, without any additional power supply or power signal.

In step 406, the ultrasonic through-wall sensor system 100 can electroacoustically communicate the frequency sweep signal to a resonant sensor a transducer pair 112. For example, the frequency sweep signal can be applied to an external electroacoustic transducer 115 outside of the isolated environment, and an internal electroacoustic transducer 115 can detect the frequency sweep signal.

The frequency sweep signal can, in some cases, be modulated using an ultrasonic frequency carrier signal, as discussed above. In these cases, the modulated frequency sweep signal can be demodulated within the isolated environment by a demodulator device.

In step 409, the ultrasonic through-wall sensor system 100 can generate a sensor output signal. The resonant sensor 268 can receive the frequency sweep signal as an input and output or generate a sensor output signal. The frequency sweep signal can excite the resonant sensor 268 to generate the sensor output signal. The sensor output signal can be provided to the electroacoustic transducer 115c by the resonant sensor 268. The resonant sensor 268 can include a surface acoustic wave (SAW) sensor, a bulk acoustic wave (BAW) sensor and other resonant sensors. The resonant sensor 268 can measure parameters including presence of humidity, viscosity, radiation, electromagnetic fields, chemical vapors, biological matter, and other items. In addition, the resonant sensor 268 can quantify the humidity, viscosity, radiation, electromagnetic fields, chemical vapors, biological matter, and other items.

The sensor output signal can, in some cases, be modulated using an ultrasonic frequency carrier signal, as discussed above. A modulator within the isolated environment can perform this function. The modulated sensor output signal can be demodulated outside the isolated environment by a demodulator device.

In step 412, the ultrasonic through-wall sensor system 100 can electroacoustically communicate the sensor output signal to a function analyzer. The sensor output signal can be communicated through an electroacoustic transducer pair 112, which can be a different pair than the pair that communicates the frequency sweep signal. For example, the sensor output signal can be applied to an internal electroacoustic transducer 115 inside of the isolated environment, and an external electroacoustic transducer 115 can detect the sensor output signal.

In step 415, the ultrasonic through-wall sensor system 100 can determine a resonant frequency of the sensor output signal. The function analyzer 274 or control device 127 can analyze the sensor output signal in the time domain or frequency domain in order to identify a resonant frequency of the sensor output signal. For example, the function analyzer 274 can plot the sensor output signal in the frequency domain.

In step 418, the ultrasonic through-wall sensor system 100 can identify a sensor parameter based on the resonant frequency of the sensor output signal. The function analyzer 274 or control device 127 can determine a sensor parameter based on the resonant frequency of the sensor output signal. For example, the manufacturer of the sensor device can provide a sensor parameter table or another data structure that correlates a particular resonant frequency with a particular sensor parameter or value. The function analyzer 274 or other components of the control device 127 can identify the sensor parameter based on the resonant frequency and the sensor parameter table or data structure.

In step 421, the ultrasonic through-wall sensor system 100 can perform a notification or adjustment based on the sensor parameter. The client device 109 can include a computer system, mobile device, monitor, or other device that includes a screen or display device 136. The display device 136 can render a user interface 139. The user interface 139 can also include measurements, notifications, and other elements that are generated and/or triggered based on the resonant frequency of the resonant sensor device 133.

In some cases, the client device 109 can include control equipment that controls or adjusts environmental characteristics of an isolated environment such as a temperature, pressure, or other environmental characteristic. The control equipment can be adjusted in response to resonant sensor data indicative of a particular sensor parameter or combination of sensor parameters.

Figure 5:
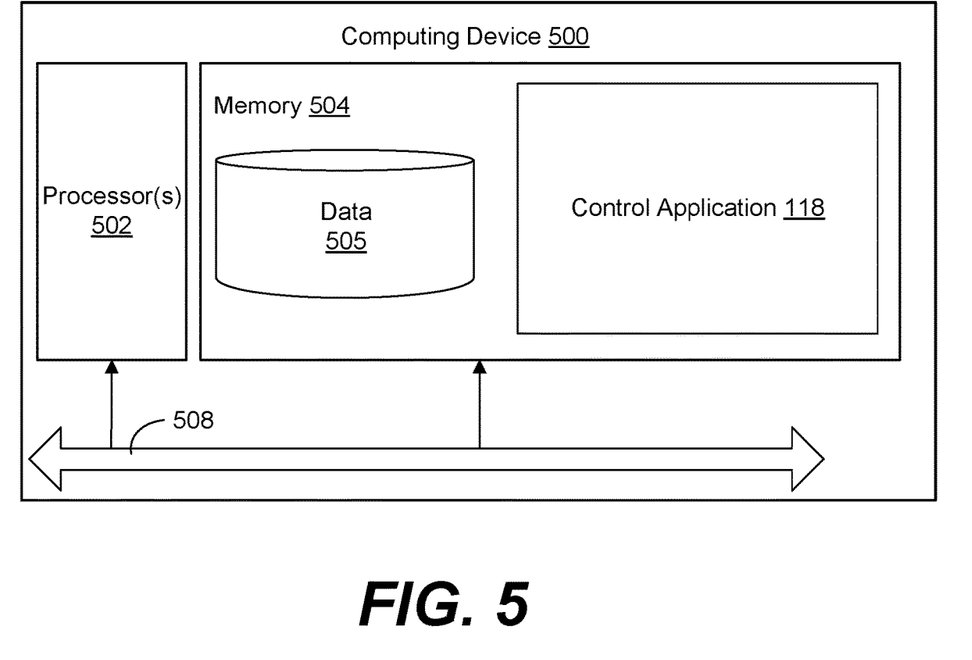
FIG. 5 illustrates an example control device of an ultrasonic through-wall sensor system according to various embodiments described herein.

As shown in FIG. 5, the computing device 500 includes at least one processing system, for example, having a processor 502 and a memory 504, both of which are electrically and communicatively coupled to a local interface 508. The local interface 508 can be embodied as a data bus with an accompanying address/control bus or other addressing, control, and/or command lines, for data communications and addressing between the processor 502, the memory 504, and the control application 154 such as an image sensor control application and a resonant frequency sensing control application. The computing device 500 can include a computing device that is or includes the control device 103.

In various embodiments, the memory 504 stores data 506 and other software or executable-code components executable by the processor 502. The data 506 can include data related to the operation of the ultrasonic through-wall sensor system 100, and other data. Among others, the executable-code components can include components associated with the control application 118 and an operating system for execution by the processor 502. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

The memory 504 stores software for execution by the processor 502. In this respect, the terms "executable" or "for execution" refer to software forms that can ultimately be run or executed by the processor 502, whether in source, object, machine, or other form. Examples of executable programs include, for example, a compiled program that can be translated into a machine code format and loaded into a random access portion of the memory 504 and executed by the processor 502, source code that can be expressed in an object code format and loaded into a random access portion of the memory 504 and executed by the processor 502, or source code that can be interpreted by another executable program to generate instructions in a random access portion of the memory 504 and executed by the processor 502, etc.

In various embodiments, the memory 504 can include both volatile and nonvolatile memory and data storage components. Volatile components are those that do not retain data values upon loss of power. Nonvolatile components are those that retain data upon a loss of power. Thus, the memory 904 can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory 904.

The processor 502 can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the control application 118 and other instructions of the components described herein can represent one or more module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor 502 can be directed by execution of the program instructions to perform certain processes, such as those illustrated in the flowcharts described herein. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor 502. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

The functionalities of the control systems and other devices discussed herein can be executed using a computing device that can include at least one processor circuit, for example, having a processor and at least one memory device. These components can couple to a local interface. A computing device can include, for example, at least one computer, mobile device, smartphone, computing device, or like device. The local interface can include, for example, a data bus with an accompanying address/control bus or other bus structure.

In order to provide the functionalities discussed, a number of software components can be stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor; code that can be expressed in a format such as object code that is capable of being loaded into a random access portion of the one or more memory devices and executed by the processor; or code that can be interpreted by another executable program to generate instructions in a random access portion of the memory devices to be executed by the processor. Steps or functions performed by the programs or instructions can be considered a method or method steps performed by a computing device executing the instructions. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components. The memory devices can be considered a non-transitory computer readable medium.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The computing device can include a display upon which a user interface can be rendered to show visual indications of the functionalities described. The computing device can also include one or more input/output devices that can include, for example, a capacitive touchscreen or other type of touch input device, fingerprint reader, or keyboard.

The various services and functions described can be embodied in software or code executed by general purpose hardware as discussed above. The same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits, having logic gates for implementing various logic functions upon an application of one or more data signals, application specific integrated circuits (ASICs) having appropriate logic gates, field-programmable gate arrays (FPGAs), or other components. The executable instructions can be stored in at least one memory and executed by at least one computing device or at least one processor of the at least one computing device.

Assessment standard data including scores for specific organizations, score maximums, criteria descriptions, and other assessment standard data can be stored in the at least one memory. Calculation data for each of the calculations and functions described can be stored in the at least one memory. This data can be accessed to generate the user interfaces described herein.

The flowcharts or process diagrams of FIGS. 3 and 4 can be representative of certain methods or processes, functionalities, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 902. The machine code can be converted from the source code, etc. Further, each block can represent, or be connected with, a circuit or a number of interconnected circuits to implement a certain logical function or process step.

Although the flowcharts illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Although embodiments have been described herein in detail, the descriptions are by way of example. In other words, the embodiments described herein are not limited to the specifically described embodiments. The features of the embodiments described herein are representative and, in alternative embodiments, certain features and elements may be added or omitted. While some aspects are described with respect to a particular figure, it is understood that these aspects are combinable and applicable to the aspects discussed with respect to the other figures. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. An ultrasonic through-wall sensor system, the system comprising:
   a surface acoustic wave (SAW) sensor device within a contained environment, wherein the SAW sensor device within the contained environment is excited to generate a sensor output signal by a frequency sweep signal and without any additional power supply within the contained environment, and wherein components of the ultrasonic through-wall sensor system within the contained environment are limited to the SAW sensor device and at least one electroacoustic transducer;
   a pair of electroacoustic transducers that transmits the sensor output signal from an inside of the contained environment to an outside of the contained environment, wherein the pair of electroacoustic transducers are coaxially aligned on opposite sides of a wall that isolates the contained environment; and
   a sensor data recovery component that renders a user interface based on the sensor output signal.

2. The system of claim 1, wherein the frequency sweep signal comprises an ultrasonic frequency.

3. The system of claim 1, wherein the sensor data recovery component comprises a function analyzer.

4. The system of claim 1, further comprising:
   a function generator outside the contained environment that generates the frequency sweep signal.

5. The system of claim 1, wherein the sensor data recovery component analyzes the sensor output signal in a time domain to identify a resonant frequency.

6. The system of claim 1, wherein the sensor data recovery component analyzes the sensor output signal in a frequency domain to identify a resonant frequency.

7. The system of claim 1, wherein the SAW sensor device identifies at least one of: humidity, viscosity, radiation, electromagnetic fields, chemical vapors, and biological matter.

8. An ultrasonic through-wall sensor system, the system comprising:
   a resonant sensor device in an isolated environment behind a wall, wherein the resonant sensor device is excited by a frequency sweep signal to generate sensor data as a sensor output signal, and wherein the resonant sensor device is a surface acoustic wave (SAW) sensor device or a bulk acoustic wave (BAW) sensor device;
   a coaxially aligned pair of electroacoustic transducers that transmits the sensor output signal through the wall of the isolated environment;
   a demodulator that demodulates the sensor output signal to generate a demodulated sensor signal; and
   a sensor data recovery component that converts the demodulated sensor signal into a recovered sensor parameter.

9. The ultrasonic through-wall sensor system of claim 8, wherein the resonant sensor device comprises a radiation sensor device.

10. The ultrasonic through-wall sensor system of claim 8, wherein the resonant sensor device resonates in response to the frequency sweep signal.

11. The ultrasonic through-wall sensor system of claim 8, wherein the sensor data recovery component generates the recovered sensor parameter based on a sensor parameter table and a resonant frequency of the demodulated sensor signal.

12. The ultrasonic through-wall sensor system of claim 8, wherein the frequency sweep signal is generated by a function generator outside the isolated environment.

13. The ultrasonic through-wall sensor system of claim 8, wherein the frequency sweep signal comprises an ultrasonic carrier signal.

14. A method, comprising:
generating a sensor output signal using a resonant sensor device in an isolated environment behind a wall, wherein the resonant sensor device is excited to generate the sensor output signal by a frequency sweep signal, and wherein the resonant sensor device is a surface acoustic wave (SAW) sensor device or a bulk acoustic wave (BAW) sensor device;
communicating, by a coaxially aligned pair of electroacoustic transducers, the sensor output signal through the wall of the isolated environment;
demodulating, by a demodulator, the sensor output signal to output a demodulated sensor signal; and
converting, by a sensor data recovery component, the demodulated sensor signal into a recovered sensor parameter.

15. The method of claim 14, further comprising:
generating, by a function generator, the frequency sweep signal, wherein the sensor output signal is generated by applying the frequency sweep signal to the resonant sensor device.

16. The method of claim 14, wherein the resonant sensor device identifies at least one of: humidity, viscosity, radiation, electromagnetic fields, chemical vapors, and biological matter.

17. The method of claim 14, further comprising:
applying an environmental control adjustment based on the recovered sensor parameter.

18. The method of claim 14, further comprising:
generating a notification based on the recovered sensor parameter.

19. The method of claim 14, wherein the sensor data recovery component converts the demodulated sensor signal into temperature reading.

20. The method of claim 14, wherein the sensor data recovery component analyzes the sensor output signal in at least one of: a time domain or a frequency domain.

* * * * *